United States Patent
Takahashi et al.

(10) Patent No.: US 7,816,424 B2
(45) Date of Patent: Oct. 19, 2010

(54) BIODEGRADABLE PLASTICS COMPOSITION, MOLDED ARTICLE OF THE COMPOSITION, AND METHOD OF CONTROLLING BIODEGRADATION RATE

(75) Inventors: Ikuo Takahashi, Chiba (JP); Hirotaka Iida, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 602 days.

(21) Appl. No.: 11/745,567

(22) Filed: May 8, 2007

(65) Prior Publication Data
US 2007/0265371 A1 Nov. 15, 2007

(30) Foreign Application Priority Data
May 10, 2006 (JP) .............................. 2006-131031

(51) Int. Cl.
*C08K 5/34* (2006.01)
*C08K 5/3435* (2006.01)
*C08K 5/3492* (2006.01)
*C08K 5/29* (2006.01)
*C08K 5/13* (2006.01)
*C08K 5/524* (2006.01)
*D06P 1/52* (2006.01)

(52) U.S. Cl. ..................... 523/124; 524/91; 524/99; 524/100; 524/102; 524/195

(58) Field of Classification Search ................. 523/124; 524/91, 99, 100, 102, 195
See application file for complete search history.

(56) References Cited

U.S. PATENT DOCUMENTS

2004/0132860 A1* 7/2004 Takahashi et al. ........... 523/124

FOREIGN PATENT DOCUMENTS

| EP | 1505110 | 2/2005 |
|---|---|---|
| EP | 1876205 | 1/2008 |
| JP | 06-184417 | 7/1994 |
| JP | 11-080522 | 3/1999 |
| JP | 2001-525473 | 12/2001 |
| JP | 2002-114893 | 4/2002 |
| JP | 2003-313436 | 11/2003 |
| JP | 2004-155993 | 6/2004 |
| JP | 2005-082642 | 3/2005 |
| WO | WO 2006/118096 | 11/2006 |

OTHER PUBLICATIONS

Extended European Search Report dated Sep. 1, 2009, for Application No. EP 07 00 9100.

* cited by examiner

*Primary Examiner*—Kriellion A Sanders
(74) *Attorney, Agent, or Firm*—Antonelli, Terry, Stout & Kraus, LLP.

(57) ABSTRACT

Provided are: a biodegradable plastics composition which controls a biodegradation rate with a synergistic controlling effect on three components, adjusts a hydrolysis rate, and shows significantly improved weatherability; a molded article of the composition; and a method of controlling the biodegradation rate of a biodegradable plastics. The biodegradable plastics composition includes: a biodegradable plastics; and a carbodiimide compound, an ultraviolet ray absorbent, and an antioxidant to be blended as essential ingredients into the biodegradable plastics, and the molded article of the composition is also provided.

15 Claims, No Drawings

BIODEGRADABLE PLASTICS COMPOSITION, MOLDED ARTICLE OF THE COMPOSITION, AND METHOD OF CONTROLLING BIODEGRADATION RATE

BACKGROUND OF THE INVENTION

1. Field of the Invention

The present invention relates to a biodegradable plastics composition, a molded article of the composition, and a method of controlling a degradation rate, and more specifically, to a biodegradable plastics composition in which a biodegradable plastics is blended with three kinds of specific additives so that its biodegradation rate is controlled, its hydrolysis rate is retarded, and its weatherability is significantly improved by the synergistic effect of the additives, a molded article of the composition, and a method of controlling the degradation rate of the biodegradable plastics.

2. Description of the Related Art

In recent years where a problem such as environmental pollution due to plastics wastes is zoomed in on, the frequency at which a biodegradable plastics is used has been increasing, and the modification of the plastics has been advanced owing to increasing need for, and increasing significance of, environmental protection.

The biodegradable plastics are roughly classified into aliphatic polyesters having ester bonds in a molecular backbone thereof (including those produced by microorganisms), natural macromolecule type polymers such as cellulose, polysaccharides produced by microorganisms, polyvinyl alcohol (PVA), and polyethers such as polyethylene glycol (PEG).

Of those, aliphatic polyesters have not been utilized as the biodegradable plastics because they have, in general, low melting points and poor heat stability in their production stages, and a molecular weight to be obtained is not large enough to provide physical properties suitable for practical molded articles. With technological developments to solve these problems, a high molecular weight of aliphatic polyester has come out, and started to be used in such fields as materials for agriculture, forestry, and fishery (agricultural mulch film, plantation pot, fishing line, fishing net, and the like), materials for civil engineering work (water holding sheet, net for plants, sandbag, and the like), and packaging and containers (those difficult to be recycled due to adhered soil, foods, and the like).

A biodegradable plastics typified by the above polymeric aliphatic polyester is preferably degraded quickly by microorganisms widely present in the natural world after having been disposed of. However, when a biodegradable plastics is put into widespread use so as to be utilized as an alternative to a conventional plastics, in particular, as a consumer durable, it is indispensable to cause the biodegradable plastics to retain functions such as weatherability, water resistance, heat resistance, and mechanical properties as high as those of the conventional plastics during the long-term use of the biodegradable plastics. It has been sufficient for a conventional biodegradable plastics used in a consumer durable to retain such functions for about five years. In recent years, however, a biodegradable plastics capable of retaining such functions for about ten years or longer has been requested.

A method involving adjusting the biodegradation rate of a biodegradable plastics to improve the resistance of the biodegradable plastics to hydrolysis is one method of causing the biodegradable plastics to retain functions as high as those of a conventional plastics during the long-term use of the biodegradable plastics. As an example of the method, JP 11-80522 A, for example, proposes a biodegradable plastics composition in which a biodegradable plastics is blended with a carbodiimide compound so that its biodegradation rate is controlled. However, the composition has an insufficient function of adjusting the hydrolysis rate or biodegradation rate of the plastics in some cases.

Further, JP 2001-525473 A, for example, proposes a biodegradable plastics added with an aromatic carbodiimide as a hydrolysis stabilizer so that the degradation of the plastics is retarded. However, the plastics involves a problem in that resultant products therefrom lose its transparency irrespective of the amount in which the stabilizer is added.

Moreover, JP 06-184417 A, for example, proposes a lactic acid-based composition and the like in which a lactic acid-based polymer as a biodegradable plastics is blended with at least one type of additive selected from the group consisting of ultraviolet absorbents and light stabilizers. However, this invention is aimed at controlling decomposition of the polymer by solar rays or the like, but not at controlling biodegradation.

Meanwhile, JP 2002-114893 A, for example, proposes a thermoplastic polyester resin composition, which is not biodegradable, in which a thermoplastic polyester resin is compounded with a resin-based ultraviolet absorbent and aliphatic-based polycarbodiimide compound to improve resistances of the resin, which has a relatively high heat resistance, weatherability, alkali or hydrolysis resistance. However, the resin-based ultraviolet absorbent disclosed in JP 2002-114893 A involves a problem of being not compatible with a thermoplastic polyester resin.

To solve the above problems, JP 2003-313436 A, for example, proposes a biodegradable plastics composition obtained by blending a biodegradable plastics with a carbodiimide compound and a hindered phenol-based antioxidant.

In addition, JP 2004-155993 A, for example, proposes a biodegradable plastics composition obtained by blending a biodegradable plastics with a carbodiimide compound and at least one kind of a compound selected from a benzotriazole-based compound, a triazine-based compound, and a hydroxylamine-based compound.

Further, JP2005-82642A, for example, proposes a biodegradable plastics composition using a hydrolysis-resistant stabilizer composed of a carbodiimide composition obtained by blending an aliphatic carbodiimide compound with a phosphorus-based antioxidant.

However, the resistance of each of the above compositions to hydrolysis is insufficient in some cases.

Moreover, none of the respective patent documents described above describes that both an ultraviolet absorbent (hereinafter, referred to a UV absorbent) and an antioxidant are actively used in combination with a carbodiimide compound, and an effect by the combined use.

In addition, in particular, biodegradable plastics derived from natural products among the biodegradable plastics are produced from reproducible organic resources, and have been recently attracting attention from the viewpoints of the prevention of global warming and the establishment of a cyclic society. However, there are no descriptions concerning a fact that both an ultraviolet absorbent and an antioxidant, and a carbodiimide compound should be actively blended together into any one of those biodegradable plastics derived from natural products, and an effect exerted by the blending.

SUMMARY OF THE INVENTION

An object of the present invention is to provide a biodegradable plastics composition which: solves the problems of the prior art; has controlled biodegradability; and shows significantly improved resistance to hydrolysis and significantly improved weatherability, a molded article of the composition, and a method of controlling the biodegradation rate of a biodegradable plastics.

The inventors of the present invention have made extensive studies with a view to achieving the above object. As a result, they have found that a biodegradable plastics composition with an adjusted biodegradation rate, significantly improved resistance to hydrolysis, and significantly improved weatherability can be obtained by blending a biodegradable plastics with three kinds of components, that is, a carbodiimide compound, an ultraviolet absorbent (hereinafter, occasionally referred to a UV absorbent), and an antioxidant as essential ingredients. Thus, they have completed the present invention.

That is, according to the present invention, there are provided the following items (1) to (14):

(1) a biodegradable plastics composition containing a biodegradable plastics, a carbodiimide compound, an ultraviolet absorbent, and an antioxidant, (2) A biodegradable plastics composition according to the above item (1), in which the biodegradable plastics is one of a plastics derived from natural products and a plastics produced by microorganisms, (3) A biodegradable plastics composition according to the above items (1) or (2), in which the biodegradable plastics is an aliphatic polyester, (4) A biodegradable plastics composition according to the above item (3), in which the aliphatic polyester is an aliphatic hydroxy-carboxylic polyester, (5) A biodegradable plastics composition according to any one of the above items (1) to (4), in which the carbodiimide compound is an aliphatic polycarbodiimide compound, (6) A biodegradable plastics composition according to any one of the above items (1) to (5), in which the carbodiimide compound is mainly composed of a component derived from at least one kind of organic diisocyanates selected from the group consisting of 4,4'-dicyclohexylmethane diisocyanate, isophorone diisocyanate, and tetramethylxylylene diisocyanate, (7) A biodegradable plastics composition according to any one of the above items (1) to (6) in which the ultraviolet absorbent is at least one kind of an ultraviolet ray absorbent selected from the group consisting of a benzotriazole-based compound, a triazine-based compound, and a hydroxylamine-based compound, (8) A biodegradable plastics composition according to any one of the above items (1) to (7), in which the ultraviolet absorbent has a molecular weight of 400 or more, (9) A biodegradable plastics composition according to any one of the above items (1) to (8), in which the antioxidant is at least one of a hindered phenol-based antioxidant and a phosphite-based antioxidant,

(10) A biodegradable plastics composition according to any one of the above items (1) to (9), in which the antioxidant has a molecular weight of 400 or more,

(11) A biodegradable plastics composition according to the above item (8) or (10), in which the ultraviolet absorbent and/or the antioxidant are blended at the time of a synthesis of the carbodiimide compound to prepare a carbodiimide composition, followed by blending with a biodegradable plastics.

(12) A biodegradable plastics composition according to any one of the above items (1) to (11), in which 100 parts by mass of the biodegradable plastics (A) is blended with 0.01 to 10 parts by mass of the carbodiimide compound (B), 0.01 to 5 parts by mass of the ultraviolet absorbent (C), and 0.01 to 3 parts by mass of the antioxidant,

(13) A molded article molded by the biodegradable plastics composition according to any one of the above items (1) to (12), and

(14) A method of controlling a biodegradation rate of a biodegradable plastics, the method including blending the biodegradable plastics with a carbodiimide compound, an ultraviolet absorbent, and an antioxidant.

According to the present invention, there can be obtained a biodegradable plastics composition with a controlled biodegradation rate of a biodegradable plastics, significantly improved resistance to hydrolysis, and significantly improved weatherability and a molded article of the composition.

DETAILED DESCRIPTION OF THE PREFERRED EMBODIMENTS

A biodegradable plastics composition of the present invention contains a biodegradable plastics blended with three components, that is, a carbodiimide compound, a UV absorbent, and an antioxidant as essential ingredients. Hereinafter, the biodegradable plastics composition of the present invention will be described in detail.

1. Biodegradable Plastics

Examples of the biodegradable plastics as a main component to be used in the biodegradable plastics composition of the present invention include a polyester-based biodegradable plastics degraded by microorganisms and a biodegradable plastics obtained by using a raw material derived from natural products. Of those, there is preferable an aliphatic polyester that can be easily degraded by a microorganism after having been disposed of.

In general, the biodegradable plastics is believed to undergo biodegradation through the following processes (a) to (d) in this order. That is, in a polymer material (biodegradable plastics) discharged into an environment, the following takes place.

(a) A polymer degrading enzyme is first adsorbed onto the surface of the polymer material. This enzyme is a substance secreted extracellularly by a certain kind of microorganisms.

(b) The enzyme then breaks chemical bonds in polymer chains such as ester, glycosidic, and peptide bonds by a hydrolysis reaction.

(c) As a result, the polymer material is reduced in molecular weight and decomposed even to a low-molecular-weight compound unit by the degrading enzyme.

(d) Finally, decomposed products are further metabolized and utilized by various microorganisms and converted into carbon dioxide, water, and bacterial cell components.

On the other hand, a poly($\alpha$-oxyacid) typified by polylactic acid, is believed to undergo biodegradation in the following two stages.

That is, in a primary decomposition, high-molecular-weight polylactic acid, which is hardly decomposed by microorganisms, is decomposed mainly by simple hydrolysis involving no microorganisms. After decomposed to have a number-average molecular weight (Mn) of the order of 10,000 to 20,000, the polylactic acid undergoes a secondary decomposition stage proceeding in the presence of a polymer degrading enzyme produced by microorganisms, in addition to the simple hydrolysis, and is further decomposed to a low-molecular-weight compound unit. The decomposed products are further metabolized by various microorganisms and converted into carbon dioxide, water, and bacterial cell components which are utilized as products.

The aliphatic polyesters which are easily hydrolyzed and decomposed by microorganisms include:

(1) a hydroxycarboxylic acid type aliphatic polyester;
(2) an aliphatic polyester as a product of condensation reaction of a polyvalent alcohol and a polybasic acid;
(3) an aliphatic polyester such as polyhydroxybutylate (PHB) produced by microorganisms; and
(4) a polycaprolactone (PCL) type aliphatic polyester. Any of the above aliphatic polyesters can be preferably used as the biodegradable plastics for the present invention.

Further, in the present invention, the biodegradable plastics is not limited to the above-described aliphatic polyesters but any types thereof can be used as long as they have such chemical bonds as ester, glycosidic and peptide bonds which facilitate a scission of polymer chain in the biodegradable plastics by the hydrolysis reaction. Such type of polymers include, for example, a carbonate copolymer of the aliphatic polyester produced by randomly introducing a carbonate structure into a molecular chain backbone of the aliphatic polyester, and a copolymer of a polyamide and the aliphatic polyester having amide bonds and produced by introducing an aliphatic polyamide unit into a molecular chain backbone of the aliphatic polyester.

Subsequently, the biodegradable plastics will be described in more detail.

(1) Hydroxy-carboxylic Acid Type Aliphatic Polyester

A hydroxy-carboxylic acid type aliphatic polyester is not particularly limited. Specific examples of a suitable aliphatic hydroxy-carboxylic polyester include polymers or copolymers of lactic acid, glycolic acid, 2-hydroxyisobutyric acid, 3-hydroxybutyric acid, 3-hydroxypropionic acid, 3-hydroxycarboxylic acid, 4-hydroxybutyric acid, 4-hydroxyvaleric acid, 5-hydroxyvaleric acid, and 6-hydroxycaproic acid which are an aliphatic hydroxy-carboxylic acids. A copolymerized polyester resin composed of any one of those aliphatic hydroxy-carboxylic acids and, for example, an aromatic dicarboxylic acid, an aliphatic dicarboxylic acid, an alicyclic dicarboxylic acid, an aliphatic diol, an alicyclic diol, or an aromatic diol is also permitted.

Of those, polylactic acid, polycarboxylic acid, and the like are preferable, and a polylactic acid (polylactide)-based aliphatic polyester typified by polylactic acid is particularly preferable.

The above-described polylactic acid type aliphatic polyester can be obtained, in general, by a ring-opening polymerization method of lactide which is a cyclic diester, and corresponding lactone (so-called lactide method), as well as a direct dehydration condensation method of lactic acid and a polycondensation method of formalin and carbon dioxide, as a method other than the lactide method.

Further, examples of the catalyst for producing the above-described polylactic acid type aliphatic polyester include tin, antimony, zinc, titanium, iron, and aluminum compounds. Of those, a tin-based or aluminum-based catalyst is more preferable, and tin octoate and aluminum acetylacetonate are particularly preferable.

Of the above-described polylactic acid type aliphatic polyesters, poly(L-lactic acid) is preferable because it is hydrolyzed to L-lactic acid, whose safety has already been confirmed. However, the polylactic acid type aliphatic polyesters useful for the present invention are not limited to the above type polyesters.

(2) Aliphatic Polyester as a Product of Condensation Reaction of Polyvalent Alcohol and Polybasic Acid.

Examples of the aliphatic polyester as a product of condensation reaction of polyvalent alcohol and polybasic acid include an aliphatic glycol/polybasic acid type polyester obtained by reacting an aliphatic glycol with an aliphatic polybasic acid (or anhydride thereof) in the presence of a catalyst, and a high-molecular-weight aliphatic glycol/polybasic acid type polyester obtained in the presence of a small amount of coupling agent, if necessary.

The aliphatic glycols for producing the aliphatic glycol/polybasic acid type polyesters useful for the present invention include, for example, ethylene glycol, 1,4-butandiol, 1,6-hexanediol, decamethylene glycol, neopentyl glycol, and 1,4-cyclohexanedimethanol. Ethyleneoxide can be also used. Those glycols may be used in combination.

Examples of the aliphatic polybasic acid or anhydride thereof to form the aliphatic glycol/polybasic acid type polyester by the reaction with the above-described aliphatic glycol include succinic acid, adipic acid, suberic acid, sebacic acid, dodecanoic acid, succinic anhydride, and adipic anhydride, which are generally available in the market and can be used for the present invention. Two or more of those polybasic acids and anhydrides thereof may be used in combination.

The above-described glycols and polybasic acids are of aliphatic type. They may be used together with a small amount of another component, such as an aromatic glycol or an aromatic polybasic acid such as terephthalic acid, trimellitic anhydride, or pyromellitic anhydride.

In addition, examples of the catalyst to produce the above-described aliphatic glycol/polybasic acid type polyester are salts of organic acids, alkoxides, and oxides of such metals as titanium, tin, antimony, cerium, zinc, cobalt, iron, lead, manganese, aluminum, magnesium, or germanium, and of those, a tin-based or aluminum-based compound is more preferable.

The above-described aliphatic glycol/polybasic acid type polyester may be produced by reacting an equivalent amount of the aliphatic glycol and aliphatic polybasic acid together with the catalyst by heating, using a solvent appropriately selected depending on raw material compounds if necessary, and a prepolymer with a low degree of polymerization can be produced by controlling progress of the reaction.

In the production of the above-described aliphatic glycol/polybasic acid type polyester, a coupling agent can be used, in particular, for the prepolymer with low degree of polymerization, to further increase its number-average molecular weight. Examples of the coupling agent include diisocyanates, oxazolines, diepoxy compounds, and acid anhydrides. Of those, diisocyanates are particularly preferably used.

Examples of the diisocyanates as the above-described coupling agent include, but are not particularly limited to 2,4-tolylene diisocyanate, a mixture of 2,4-tolylene diisocyanate and 2,6-tolylene diisocyanate, diphenylmethane diisocyanate, 1,5-naphthalene diisocyanate, xylylene diisocyanate, hydrogenated xylylene diisocyanate, hexamethylene diisocyanate, isophorone diisocyanate, 4,4'-dicyclohexylmethane diisocyanate. Hexamethylene diisocyanate is particularly preferable in view of a hue of the aliphatic glycol/polybasic acid type polyester obtained and reactivity while being compounded into the above-described prepolymer.

The above coupling agent is blended in an amount of, for example, about 0.1 to 5 parts by mass, or preferably 0.5 to 3 parts by mass with respect to 100 parts by mass of the prepolymer. An amount in which the coupling agent is blended of 0.1 part by mass or more can sufficiently advance the coupling reaction of the prepolymer, while an amount in which the coupling agent is blended of 5 parts by mass or less can suppress the gelation of the prepolymer.

Moreover, in the above-described aliphatic glycol/polybasic acid type polyester, terminal hydroxyl groups may be capped by other compounds via a double bond, urethane bond, or urea bond, or may be a modified one.

Typical examples of the aliphatic polyester on the markets, as a condensation product of polyvalent alcohol and polybasic acid, include polybutylene succinate (PBS) and polyethylene succinate (PES) or the like.

Examples of the polybutylene succinate (PBS) type aliphatic polyester include polybutylene succinate (PBS) made from butanediol and succinic acid, an adipate copolymer (PBSA) obtained by copolymerizing adipic acid to accelerate biodegradability, and adipate/terephthalate copolymer obtained by copolymerizing terephthalic acid. The commercially available products include "BIONOLLE (trade name)", "ENPOL (trade name)", "ECOFLEX (trade name)" and "BIOMAX (trade name)" available from Showa High polymer, Ltd., Ire Chemical, Ltd., BASF AG, and Du Pont, Ltd., respectively.

In addition, a polyethylene succinate (PES) is also commercially available. As a commercially available product, "LUNARLE SE (trade name)" is available from Nippon Shokubai, Ltd.

(3) Aliphatic Polyester Produced by Microorganisms

A certain kind of microorganisms accumulate a polyester in their cells. The polyester produced by microorganisms is a thermoplastic polymer with a melting point derived from the organisms. Such a polyester is decomposed by an enzyme secreted extracellularly by a microorganism in natural environment and completely disappears because decomposition products are consumed by the microorganism.

Such (aliphatic) polyesters produced by microorganisms include a polyhydroxybutyrate (PHB), a poly(hydroxybutyric acid-hydroxypropionic acid) copolymer, and a poly(hydroxybutyric acid-hydroxyvaleric acid) copolymer or the like.

(4) Polycaprolactone (PCL) Type Aliphatic Polyester

Polycaprolactone, which is a kind of aliphatic polyesters, is obtained by a ring-opening polymerization of ε-caprolactone, and can be decomposed by various microorganisms, although it is a water-insoluble polymer.

Polycaprolactone is an aliphatic polyester expressed by a general formula H—[O(CH$_2$)$_5$CO]$_n$—H, and examples of a commercially available product of the polycaprolactone type aliphatic polyester include "TONE (trade name)" series available from Nippon Unicar and "Placcell (trade name)" series available from Daicell Chemical Industry, Ltd.

In the above various biodegradable plastics, plastics derived from natural products is produced from a reproducible organic resources, and is preferably used as the biodegradable plastics in the present invention from today's viewpoint of: the prevention of global warming; the establishment of a cyclic society; or carbon neutral. Biodegradable plastics using raw materials derived from natural products (such as a polybasic acid in an aliphatic glycol/polybasic acid type polyester) is also preferable in the present invention because of the same reason.

2. Carbodiimide Compound

The carbodiimide compounds (including polycarbodiimide compounds) useful for the present invention are carbodiimide compounds having at least one carbodiimide group in the molecule. The carbodiimide compounds can be synthesized by commonly well-known methods. The compound can be obtained, for example, by conducting a decarboxylation condensation reaction of various polyisocyanates with an organophosphorus or organometallic compound as a catalyst at a temperature equal to or higher than about 70° C. in solventless condition or an inert solvent.

Examples of the monocarbodiimide compound included in the above-described carbodiimide compounds include dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide, and di-β-naphthylcarbodiimide. Of those, dicyclohexylcarbodiimide and diisopropylcarbodiimide are particularly preferable because of their industrial availability.

Further, as the polycarbodiimide compound included in the above-described carbodiimide compounds, those produced by various methods may be used, but basically those produced by conventional production methods for polycarbodiimide can be used (for example, the methods disclosed in U.S. Pat. No. 2,941,956, JP 47-33279 B, J. Org. Chem. 28, 2069-2075 (1963), and Chemical Review 1981, Vol. 81, No. 4, p. 619-621).

Examples of an organic diisocyanate, which is a raw material for producing a polycarbodiimide compound include aromatic diisocyanates, aliphatic diisocyanates, alicyclic diisocyanates, and a mixture thereof, and specifically include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylenediisocyanate, isophorone diisocyanate, dicyclohexylmethane-4,4'-diisocyanate, methylcyclohexane diisocyanate, tetramethylxylylene diisocyanate, 2,6-diisopropylphenyl isocyanate, and 1,3,5-triisopropylbenzene-2,4-diisocyanate.

Of those, an aliphatic (including "alicyclic") organic diisocyanate is preferable because the degree of polymerization of the polycarbodiimide compound can be easily controlled, and a synergistic controlling effect on the degradation rate of the biodegradable plastics can be easily exerted by the combined use of the three kinds of components, that is, the carbodiimide compound, the UV absorbent, and the antioxidant. In particular, isophorone diisocyanate, dicyclohexylmethane-4,4'-diisocyanate, tetramethylxylylene diisocyanate, or a mixture of two arbitrary kinds thereof is more preferably used.

In addition, in the case of the above polycarbodiimide compound, the degree of polymerization can be controlled to an appropriate value by terminating a polymerization reaction in midstream by, for example, cooling. In this case, an isocyanate group serves as a terminal. Another possible method of controlling the degree of polymerization to an appropriate value involves sealing the whole or part of remaining terminal isocyanate groups by using a compound capable of reacting with a terminal isocyanate group of the polycarbodiimide compound such as a monoisocyanate compound. The control of the degree of polymerization is preferable in terms of an improvement in quality of the biodegradable plastics composition because the control can improve, for example, compatibility between the polycarbodiimide compound and the biodegradable plastics, and the storage stability of the polycarbodiimide compound.

Examples of the monoisocyanate compound for controlling degree of polymerization of the polycarbodiimide compound by capping its terminal include phenyl isocyanate, tolyl isocyanate, dimethylphenyl isocyanate, cyclohexyl isocyanate, butyl isocyanate, and naphthyl isocyanate or the like.

Further, examples of the terminal capping agent for controlling degree of polymerization of the polycarbodiimide compound by capping its terminal is not limited to the above-described monoisocyanate compound, and include a compound having active hydrogen capable of reacting with isocyanate group. Examples of the compound include: (i) an aliphatic, aromatic, or alicyclic compound having —OH group, such as methanol, ethanol, phenol, cyclohexanol, N-methylethanolamine, polyethylene glycol monomethyl ether, and polypropylene glycol monomethyl ether; (ii) diethylamine and dicyclohexylamine each having a =NH group; (iii) butylamine and cyclohexylamine each having a —NH$_2$ group; (iv) succinic acid, benzoic acid, and cyclohexanoic acid each having a —COOH group; (v) ethylmercaptan, allylmercaptan, and thiophenol each having a —SH group; (vi) a compound having an epoxy group; and (vii) acid anhydrides such as acetic anhydride, methyltetrahydrophthalic anhydride, and methylhexahydrophthalic anhydride.

The decarboxylation condensation reaction of the above-described organic diisocyanate is performed in the presence of a preferable carbodiimidation catalyst. Examples of the carbodiimidation catalyst preferable for the present invention include an organophosphorus compound, and organometallic compound (expressed by the general formula M—(OR)$_n$, where: M is titanium (Ti), sodium (Na), potassium (K), vanadium (V), tungsten (W), hafnium (Hf), zirconium (Zr), lead (Pb), manganese (Mn), nickel (Ni), calcium (Ca), barium (Ba) or the like; R is an alkyl or aryl group having carbon atoms of 1 to 20; and n represents the valence of M. Of those, phospholeneoxide as the organophosphorus compound and alkoxide of titanium, hafnium, and zirconium as the organometallic compound are particularly preferable from the viewpoint of activity.

Specific examples of the above-described phospholeneoxides include 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide, and double bond isomers thereof. Of those, 3-methyl-1-phenyl-2-phospholene-1-oxide is particularly preferable because of its industrial availability.

The function of the carbodiimide compound in the biodegradable plastics composition of the present invention is as follows: in an initial stage after the addition of the compound, the compound reacts with a hydroxyl group or carboxyl group remaining in the biodegradable plastics which is expected to promote the hydrolysis of the plastics to suppress the hydrolysis, and, thereafter, is added to a bond of the biodegradable plastics cut by the hydrolysis reaction to cause the rejoining of the bond.

A carbodiimide compound to be used for the foregoing purpose is not particularly limited as long as it is a carbodiimide compound having such function as described above and having one or more carbodiimide groups in any one of its molecules; an aliphatic (including "alicyclic") polycarbodiimide compound having two or more carbodiimide groups in the molecules such as 4,4'-dicyclohexylmethane carbodiimide is preferable in terms of weatherability, color hue, safeness, stability, and compatibility. In addition, the compound has a degree of polymerization of preferably 2 to 20, or more preferably 5 to 20. A degree of polymerization of 2 or more is preferable in terms of heat resistance, while a degree of polymerization of 20 or less is preferable in terms of compatibility.

The carbodiimide compound is blended in an amount of preferably 0.1 to 10 parts by mass, or more preferably 0.1 to 7 parts by mass with respect to 100 parts by mass of the biodegradable plastics. An amount in which the carbodiimide compound is blended of 0.1 part by mass or more can maintain a controlling effect on the degradation rate of the biodegradable plastics. An amount in which the carbodiimide compound is blended of 10 parts by mass or less can prevent an increase in cost for the production of the biodegradable plastics composition, and, in an application where transparency is needed, can prevent the deterioration of the transparency of the biodegradable plastics composition.

3. UV Absorbent

A UV absorbent is blended as an essential ingredient into the biodegradable plastics composition of the present invention together with the carbodiimide compound and an antioxidant to be described later. The UV absorbent is preferably at least one kind of an ultraviolet ray absorbent selected from a benzotriazole-based compound, a triazine-based compound, and a hydroxylamine-based compound.

The combined use of the UV absorbent with the carbodiimide compound and the antioxidant in the biodegradable plastics composition prevents the hydrolysis of the biodegradable plastics, and exerts a significant retarding effect on the hydrolysis rate of the plastics.

(1) Benzotriazole-based Compound

Examples of the benzotriazole-based compound preferably used as one of UV absorbents to be compounded in the biodegradable plastics composition of the present invention include a compound normally used as an organic UV absorbent and for peptide condensation. It may be merely benzotriazole or its derivative.

The benzotriazole-based compound used as a UV absorbent is not particularly limited, so long as it is normally used as a UV absorbent. Examples thereof include 2-(2'-hydroxy-5'-methylphenyl)benzotriazole, 2-(2'-hydroxy-5'-t-butylphenyl)benzotriazole, 2-(2'-hydroxy-3'-t-butyl-5'-methylphenyl)-5-chlorobenzotriazole, 2-(3,5-di-t-butyl-2-hydroxyphenyl)-5-chlorobenzotriazole, 2-[2'-hydroxy-3',5'-bis(α,α-dimethylbenzyl)phenyl]benzotriazole, 2-(2'-hydroxy-3',5'-di-t-butylphenyl)benzotriazole, and 2-2'-methylenebis[4-(1,1,3,3-tetramethylbutyl)-6-[(2H-benzotriazole-2-yl)phenol)] or the like.

Specific examples of such compound include: "TINUVIN 234", "TINUVIN 320", "TINUVIN 326", "TINUVIN 327", "TINUVIN 328", and "TINUVIN P" manufactured by Ciba Specialty Chemicals; "Sumisorb 340" manufactured by Sumitomo Chemical Co., Ltd; and "Adekastab LA-31" manufactured by ASAHI DENKA, Ltd. Of those, a TINUVIN 234 and an Adekastab LA-31 each having high heat resistance are additionally effective because each of them sublimates to a small extent at the time of processing.

Examples of the benzotriazole-based compound for peptide condensation include N-hydroxybenzotriazole (or 1-hydroxybenzotriazole) and its derivative.

(2) Triazine-Based Compound

Examples of the triazine-based compound used as one of the UV absorbents to be compounded in the biodegradable plastics composition of the present invention include one generally used as an organic UV absorbent and one having at least one amino group in the molecule.

The triazine-based compound used as a UV absorbent is not particularly limited, so long as it is normally used as a UV absorbent. Examples thereof include 2-(4,6-diphenyl-1,3,5-triazine-2-yl)-5-[(hexyl)oxy]phenol and 2-[4,6-bis(2,4-dimethylphenyl)-1,3,5-triazine-2-yl]-5-[(octyl)oxy]phenol.

More specifically, examples of the commercially available products include "TINUVIN 1577" available from Ciba Specialty Chemicals, and "CYASORB UV-1164" available from Cytec Industries.

Examples of the triazine derivatives having at least one amino group in the molecule include 2,4,6-triamino-1,3,5-triazine (or melamine), 2,4-diamino-6-phenyl-1,3,5-triazine (or benzoguanamine), 2,4-diamino-6-methyl-1,3,5-triazine, 2,4-diamino-6-(2-(dodecasylamino)ethyl)-1,3,5-triazine, 2,4-diamino-6-(o-methoxyphenyl)-1,3,5-triazine, 4,6-diamino-1,2-dihydro-2,2-dimethyl-1-(2,6-xylyl)-1,3,5-triazine, 2,4-diamino-6-(2-methoxyethyl)-1,3,5-triazine, 2-amino-4-ethyl-1,3,5-triazine, 2-amino-4-phenyl-1,3,5-triazine, 2-amino-4-ethyl-6-methyl-1,3,5-triazine, 2-amino-4-ethyl-6-phenyl-1,3,5-triazine, 2-amino-4-methyl-6-phenyl-1,3,5-triazine and 2,4-bis-(n-octylthio)-6-(4-hydroxy-3,5-di-t-butylanilino)-1,3,5-triazine. More specifically, examples of the commercially available products include "IRGANOX565" and "CHIMASSORB119FL", available from Ciba Specialty Chemicals. The triazine derivative useful for the present invention is not limited to the above, and any triazine derivative may be used as long as it has at least one amino group in the molecule.

(3) Hydroxylamine-based Compound

Examples of the hydroxylamine-based compound used as one of the UV absorbents to be compounded in the biodegradable plastics composition of the present invention include a compound used for peptide condensation. Examples thereof include N-hydroxybenzotriazole (1-hydroxybenzotriazole), N-hydroxysuccinimide, and a derivative thereof. It is to be note that N-hydroxybenzotriazole is also included in the examples of the benzotriazole-based compounds described above.

In the biodegradable plastics composition of the present invention, the UV absorbent is used in combination with the carbodiimide compound and the antioxidant in such an amount that the combined use can exert a synergistic improving effect on the resistance to hydrolysis and the weatherability, in particular, the resistance to hydrolysis in the composition.

To this end, the UV absorbent is blended in an amount of preferably 0.01 to 5 parts by mass, more preferably 0.05 to 3 parts by mass, or particularly preferably 0.1 to 1 part by mass with respect to 100 parts by mass of the biodegradable plastics. An amount in which the UV absorbent is blended of 0.01 part by mass or more exerts an adjusting or controlling effect on the degradation rate of the biodegradable plastics composition, and provides a synergistic effect with the carbodiimide compound.

On the other hand, an amount in which the U absorbent is blended of 10 parts by mass or less prevents not only the impairment of the degradability of the biodegradable plastics but also an increase in cost for the production of the biodegradable plastics composition.

The UV absorbent has a molecular weight of preferably 400 or more. Setting the molecular weight of the UV absorbent to 400 or more can prevent the disappearance or vaporization of the UV absorbent at the time of the molding of the biodegradable plastics composition and the bleeding of the UV absorbent at the time of the use of a molded article of the biodegradable plastics composition. The UV absorbent has a molecular weight of more preferably 500 or more.

For example, a method involving causing the carbodiimide compound to react with the UV absorbent to increase the molecular weight of the UV absorbent can be preferably adopted as a method of preventing the disappearance or vaporization of the UV absorbent or suppressing the bleeding of the UV absorbent. According to the method, a biodegradable plastics composition excellent in resistance to light and weatherability, and a molded article of the composition can be obtained.

4. Antioxidant

In the biodegradable plastics composition of the present invention, an antioxidant is also used as an essential ingredient together with the carbodiimide compound and the UV absorbent. The antioxidant is preferably at least one kind of an antioxidant selected from a hindered phenol-based antioxidant and a phosphite-based antioxidant.

The addition of the antioxidant to the biodegradable plastics together with the carbodiimide compound and the UV absorbent exerts the following significant effect: the resistance of a biodegradable plastics composition or a molded article of the composition to hydrolysis is improved, and the transparency of the composition or the molded article is retained.

(1) Hindered Phenol-based Antioxidant

A hindered phenol-based antioxidant having a high molecular weight is preferable because such antioxidant can prevent a phenomenon in which the antioxidant disappears or vaporizes, or is extracted with a substance in contact with the antioxidant. In particular, the transfer of the antioxidant from a plastics into the food in contact with, for example, food can be prevented. In the present invention, a hindered phenol-based antioxidant having a molecular weight of 400 or more is preferably used, and a hindered phenol-based antioxidant having a molecular weight of 500 or more is more preferably used. In addition, the selection of a hindered phenol-based antioxidant having a high molecular weight can control the biodegradability of the biodegradable plastics over a long time period.

Examples of such hindered phenol-based antioxidant having a molecular weight of 400 or more include:

4,4'-methylene-bis-(2,6-di-t-butylphenol)(MW=420); octadecyl-3-(3,5-di-t-butyl-4-hydroxyphenyl)propionate (MW=531) [an IRGANOX 1076 (a trade name) available from Ciba Specialty Chemicals]; pentaerythritoltetrakis [3-(3,5-di-t-butyl-4-hydroxyphenyl)propionate] (MW =1,178) [IRGANOX 1010 (a trade name) available from Ciba Specialty Chemicals]; and 3,9-bis[2-[3-(3-tert-butyl-4-hydroxy-5-methylphenyl)propionyloxy]-1,1-dimethylethyl]-2,4,8,10-tetraoxaspiro[5.5]undecane (MW =741) [Sumilizer GA-80 (a trade name) available from Sumitomo Chemical Co., Ltd].

For example, a method involving causing the carbodiimide compound to react with an antioxidant, in particular, a hindered phenol-based antioxidant to increase the molecular weight of such antioxidant can be preferably adopted as a method of preventing the disappearance or vaporization of an antioxidant, in particular, a hindered phenol-based antioxidant or suppressing the bleeding of such antioxidant. According to the method, a biodegradable plastics composition excellent in resistance to light and weatherability, and a molded article of the composition can be obtained.

(2) Phosphite-based (Phosphorus-based) Antioxidant

Examples of the phosphite-based antioxidant include:

tris-(2,4-di-t-butylphenyl)phosphite [such as IRGAFOS 168 (a trade name) available from Ciba Specialty Chemicals or an Adekastab 2112 (trade name) available from ASAHI DENKA, Ltd.];

bis-(2,4-di-t-butylphenyl)pentaerythritol-diphosphite (such as IRGAFOS 126 (a trade name) available from Ciba Specialty Chemicals or Adekastab PEP-24G (a trade name) available from ASAHI DENKA, Ltd.);

bis-(2,6-di-t-butyl-4-methylphenyl)pentaerythritol-diphosphite (Adekastab PEP-36 (a trade name) available from ASAHI DENKA, Ltd.);

distearyl-pentaerythritol-diphosphite (such as Adekastab PEP-8 (a trade name) available from ASAHI DENKA, Ltd. or JPP-2000 (a trade name) available from JOHOKU CHEMICAL CO., LTD);

[bis(2,4-di-t-butyl-5-methylphenoxy)phosphino]biphenyl (SY-P101 available from OSAKI INDUSTRY Co., LTD); and
N,N-bis[2-[[2,4,8,10-tetrakis(1,1-dimethylethyl)dibenzo[d,f][1,3,2]dioxaphosphepin-6-yl]oxy]-ethyl]ethaneamine (IRGAFOS 12 (a trade name) available from Ciba Specialty Chemicals). A phosphite-based antioxidant having a pentaerythritol structure is preferable in terms of an improvement in resistance to hydrolysis, and a phosphite-based antioxidant having an aromatic hydrocarbon group with t-butyl group as well as the pentaerythritol structure is particularly preferable.

The chemical structural formula of bis-(2,6-di-t-butyl-4-methylphenyl)pentaerythritol-diphosphite (Adekastab PEP-36 (a trade name) available from ASAHI DENKA, Ltd.) as a particularly preferable example of the phosphite-based antioxidant is shown below.

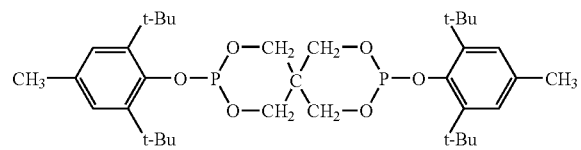

In the biodegradable plastics composition of the present invention, the antioxidant is used in combination with the carbodiimide compound and the UV absorbent in such an amount that the combined use improves the resistance of the composition to hydrolysis, and is preferably used in such an amount that the transparency of the composition can be retained. To this end, the antioxidant is blended in a total amount of preferably 0.01 to 3 parts by mass, or particularly preferably 0.1 to 2 parts by mass with respect to 100 parts by mass of the biodegradable plastics. An amount in which the antioxidant is blended of 0.01 part by mass or more retains the transparency of the biodegradable plastics composition or of a molded article of the composition. On the other hand, an amount in which the antioxidant is blended of 3 parts by mass or less can prevent not only the transfer of the antioxidant from a plastics into the food in contact with, for example, food but also the deterioration of the transparency of the composition. In addition, when the mixture of a hindered phenol-based antioxidant and a phosphite-based antioxidant is used as the antioxidant, a mass ratio between the hindered phenol-based antioxidant and the phosphite-based antioxidant is preferably in the range of 5:1 to 1:5.

It should be noted that examples of the antioxidant include antioxidants except the hindered phenol-based and phosphite-based antioxidants described above such as: aromatic amine-based antioxidants including diphenylamine and phenyl-α-naphthylamine; and sulfur-based antioxidants. Further, a small amount of an aromatic amine-based antioxidant or the like can be used in combination with the hindered phenol-based or phosphite-based antioxidant described above to such an extent that an effect of the present invention is not impaired; provided that attention should be paid upon blending of such aromatic amine-based antioxidant or the like because the blending remarkably deteriorates the transparency of the composition.

In the present invention, the carbodiimide compound, the UV absorbent, and the antioxidant described above can be blended into the biodegradable plastics by, for example, a method involving: dissolving the carbodiimide compound, the UV absorbent, and the antioxidant in an organic solvent; and removing the organic solvent by evaporation. In this case, an organic solvent which: dissolves the biodegradable plastics; is non-polymerizable; and has no active hydrogen is desirably used, and specific examples of such solvent include chloroform and tetrahydrofuran (THF).

In addition, a method involving melting and kneading the carbodiimide compound, the UV absorbent, and the antioxidant described above with an extruder, or a method involving blending the carbodiimide compound, the UV absorbent, and the antioxidant after the completion of the synthesis of the biodegradable plastics can also be employed as a method of blending the carbodiimide compound, the UV absorbent, and the antioxidant into the biodegradable plastics.

In the case of the method involving melting and kneading the carbodiimide compound, the UV absorbent, and the antioxidant with an extruder, it is sufficient to determine a method of mixing them in an appropriate manner, and examples of the method include the following methods:

(i) a method involving mixing the biodegradable plastics with the carbodiimide compound, the UV absorbent, and the antioxidant;

(ii) a method involving mixing the carbodiimide compound, the UV absorbent, and the antioxidant and mixing the resultant into the biodegradable plastics;

(iii) a method involving mixing the UV absorbent or the antioxidant at the time of the synthesis of the carbodiimide compound to produce a carbodiimide composition and mixing the carbodiimide composition with the antioxidant or the UV absorbent and the biodegradable plastics; and (iv) a method involving mixing the UV absorbent and the antioxidant at the time of the synthesis of the carbodiimide compound to produce a carbodiimide composition and mixing the carbodiimide composition with the biodegradable plastics.

In particular, the employment of the method (iii) or (iv) can suppress the discoloring of the carbodiimide compound at the time of the synthesis of the compound, and can suppress the discoloring of the carbodiimide compound at the time of the addition of the compound to a resin having an ester group or to the biodegradable plastics.

To this end, the antioxidant is blended in a total amount of preferably 0.01 to 20 parts by mass, or particularly preferably 0.1 to 10 parts by mass with respect to 100 parts by mass of the carbodiimide compound.

An amount in which the antioxidant is blended of 0.01 part by mass or more exerts a preventing effect on the discoloring of the carbodiimide compound at the time of the synthesis of the carbodiimide compound and on the discoloring of the carbodiimide compound at the time of the addition of the carbodiimide compound to a resin having an ester group or to the biodegradable plastics. On the other hand, an amount in which the antioxidant is blended of 20 parts by mass or less can avoid a problem such as a reduction in reaction rate at the time of the synthesis of the carbodiimide compound or an increase in difficulty with which the antioxidant is compatible with the carbodiimide compound.

It should be noted that the degradation rate of the biodegradable plastics composition or molded article of the present invention can be arbitrarily controlled depending on the kinds and amounts of the carbodiimide compound, the UV absorbent, and the antioxidant to be blended. Accordingly, it is sufficient to determine the kind and amount of the carbodiimide compound to be blended in accordance with a target product.

5. Other Additives and the Like In the biodegradable plastics composition of the present invention, a reinforcing material can be used in combination with the above components, that is, the carbodiimide compound, the UV absorbent, and the antioxidant as required to such an extent that the effect of the present invention is not impaired. Examples of the reinforcing material include clay, a laminar silicate, talc, mica, an inorganic or organic filler, kenaf, and pulp or the like.

In addition to the foregoing, a heat stabilizer, a flame retardant, a lubricant, waxes, a pigment, a dye, a colorant, a crystallization promoter, titanium oxide, an organic substance having degradability such as starch can also be similarly used in combination with the above components.

EXAMPLES

Hereinafter, the present invention will be described in more detail by way of examples and comparative examples. It should be noted that physical properties in the examples were measured by the following methods.

(Resistance to Hydrolysis)

Each test sample piece was left in an air-conditioned chamber maintained at 80° C. and 95% RH for a fixed period (200 hours), and ratios (%) of tensile strength and elongation after the test with respect to the values before the test were calculated. The sample with high ratios (%) of tensile strength and elongation had excellent hydrolysis resistance.

(Yellow Index)

The Yellow Index YI of a specimen produced in each of the examples and comparative examples was determined in conformance with the reflection method of JIS K7105.

NF 333 manufactured by NIPPON DENSHOKU was used as a color measurement color-difference meter.

Prior to the examples and the comparative examples, first, a carbodiimide compound or a carbodiimide composition was synthesized.

Synthesis Example 1

576.4 g of 4,4-dicyclohexylmethane diisocyanate and 50 g of cyclohexyl isocyanate were added to a flask mounted with a stirring motor, a nitrogen gas bubbling pipe, and a cooling pipe, and the whole was stirred at 100° C. for 1 hour. Thereafter, 2.9 g of a catalyst for carbodiimidation (3-methyl-1-phenyl-2-phosphorene-1-oxide) were added to the resultant, and the whole was subjected to a reaction at 185° C. for 30 hours while bubbling nitrogen gas. Thus, a carbodiimide having a urea bond at terminals of 4,4'-dicyclohexylmethane carbodiimide (polymerization degree=10) was obtained.

Synthesis Example 2

576.4 g of 4,4'-dicyclohexylmethane diisocyanate and 2.9 g of 3-methyl-1-phenyl-2-phosphorene-1-oxide were added to a flask mounted with a stirring motor, a nitrogen gas bubbling pipe, and a cooling pipe, and the whole was subjected to a carbodiimidation reaction at 1850C for 24 hours while bubbling nitrogen gas. The resultant carbodiimide had an NCO group content of 2.4% by mass.

Synthesis Example 3

576.4 g of 4,4'-dicyclohexylmethane diisocyanate and 39.6 g of cyclohexylamine were added to a flask mounted with a stirring motor, a nitrogen gas bubbling pipe, and a cooling pipe, and the whole was stirred at 100° C. for 1 hour. Thereafter, 2.9 g of a carbodiimidation catalyst (3-methyl-1-phenyl-2-phosphorene-1-oxide), 60 g of 2-(2H-benzotriazol-2-yl)-4,6-bis(1-methyl-1-phenylethyl)phenol, and 30 g of bis (2,6-di-tert-butyl-4-methylphenyl)pentaerythritol-diphosphite were added to the resultant, and the whole was subjected to a reaction at 185° C. for 30 hours while bubbling nitrogen gas. Thus, a carbodiimide having a urea bond at a terminal of 4,4-dicyclohexylmethane carbodiimide (polymerization degree=10) was obtained.

Synthesis Example 4

576.4 g of 4,4'-dicyclohexylmethane diisocyanate and 39.6 g of cyclohexylamine were added to a flask mounted with a stirring motor, a nitrogen gas bubbling pipe, and a cooling pipe, and the whole was stirred at 100° C. for 1 hour. Thereafter, 2.9 g of a carbodiimidation catalyst (3-methyl-1-phenyl-2-phosphorene-1-oxide), 100 g of 2-(2H-benzotriazol-2-yl)-4,6-bis(1-methyl-1-phenylethyl)phenol, and 50 g of pentaerythritoltetrakis[3-(3,5-di-t-butyl-4-hydroxyphenyl) propionate] were added to the resultant, and the whole was subjected to a reaction at 185° C. for 30 hours while bubbling nitrogen gas. Thus, a carbodiimide having a urea bond at a terminal of 4,4-dicyclohexylmethane carbodiimide (polymerization degree=10) was obtained.

Synthesis Example 5

576.4 g of 4,4'-dicyclohexylmethane diisocyanate and 39.6 g of cyclohexylamine were added to a flask mounted with a stirring motor, a nitrogen gas bubbling pipe, and a cooling pipe, and the whole was stirred at 100° C. for 1 hour. Thereafter, 2.9 g of a catalyst for carbodiimidation (3-methyl-1-phenyl-2-phosphorene-1-oxide), 80 g of 2-(2H-benzotriazol-2-yl)-4,6-bis (1-methyl-1-phenylethyl)phenol, 30g of pentaerythritoltetrakis [3-(3,5-di-t-butyl-4-hydroxyphenyl) propionate], and 30 g of bis(2,6-di-tert-butyl-4-methylphenyl)pentaerythritol-diphosphite were added to the resultant, and the whole was subjected to a reaction at 185° C. for 30 hours while bubbling nitrogen gas. Thus, a carbodiimide having a urea bond at a terminal of 4,4'-dicyclohexylmethane carbodiimide (polymerization degree=10) was obtained.

Examples 1 to 7

In each of Examples 1 to 7, polylactic acid ["LACEA H-400" manufactured by Mitsui Chemicals, Inc.] used as a biodegradable plastics was dry-blended with a carbodiimide compound obtained in each synthesis example (any one of Examples 1 to 5) or an aromatic carbodiimide compound (Example 6), a UV absorbent, and an antioxidant at a compounding ratio shown in Table 1. Thereafter, the mixture was kneaded with a twin-screw extruder (LABOPLASTMILL "2D 25S" manufactured by Toyo Seiki Seisaku-Sho, Ltd.) at 200° C., and a film having a thickness of 200 μm was produced from the resultant by using a T-die. A JIS 4 dumbbell type specimen was punched out of each of those films, and its physical properties were measured. Table 1 shows the compounding parts by mass and the results of the measurement. It should be noted that a Stabacsol P is an aromatic carbodiimide compound manufactured by Sumitomo Bayer Urethane, Ltd.

Comparative Example 1

A film and a specimen were produced through the same operation as that of Example 1 except that neither the UV absorbent nor the antioxidant was blended, and the physical properties of the specimen were measured. Table 1 shows the compounding parts by mass and the results of the measurement.

Comparative Example 2

A film and a specimen were produced through the same operation as that of Example 1 except that no UV absorbent was blended, and the physical properties of the specimen were measured. Table 1shows the compounding parts by mass and the results of the measurement.

Comparative Example 3

A film and a specimen were produced through the same operation as that of Example 1 except that: no antioxidant was blended; and the amount in which the UV absorbent was blended was changed from 0.5 part by mass to 0.3 part by mass, and the physical properties of the specimen were measured. Table 1 shows the compounding parts by mass and the results of the measurement.

Comparative Example 4

A film and a specimen were produced through the same operation as that of Example 1 except that: no UV absorbent was blended; and 0.05 part by mass of a phenol-based antioxidant was blended instead of 0.1 part by mass of the phosphorus-based antioxidant, and the physical properties of the specimen were measured. Table 1 shows the compounding parts by mass and the results of the measurement.

Comparative Example 5

A film and a specimen were produced through the same operation as that of Example 1 except that: no UV absorbent was used; and 0.05 part by mass of the phosphorus-based antioxidant and 0.05 part by mass of a phenol-based antioxidant were blended as antioxidants, and the physical properties of the specimen were measured. Table 1 shows the compounding parts by mass and the results of the measurement.

The amount in which each component is blended in Table 1 is represented in the unit "part(s) by mass".

Comparative Example 6

A film and a specimen were produced through the same operation as that of Comparative Example 1 except that the amount in which the carbodiimide compound was blended was changed from 5 parts by mass to 10 parts by mass, and the physical properties of the specimen were measured. Table 1 shows the compounding parts by mass and the results of the measurement.

Comparative Example 7

A film and a specimen were produced through the same operation as that of Comparative Example 2 except that: the amount in which the carbodiimide compound was blended was changed from 5 parts by mass to 10 parts by mass; and the phosphorus-based antioxidant was changed to a phenol-based antioxidant, and the physical properties of the specimen were measured. Table 1 shows the compounding parts by mass and the results of the measurement.

Comparative Example 8

A film and a specimen were produced through the same operation as that of Comparative Example 2 except that: the amount in which the carbodiimide compound was blended was changed from 5 parts by mass to 10 parts by mass; and the amount in which the phosphorus-based antioxidant was changed to 0.3 part by mass, and the physical properties of the specimen were measured. Table 1 shows the compounding parts by mass and the results of the measurement.

Example 8

Poly(butyleneadipate-terephthalate) ["Ecoflex" manufactured by BASF Japan Ltd.] used as biodegradable plastics were dry-blended with a carbodiimide compound, a UV absorbent, and an antioxidant at a compounding ratio shown in Table 2. Thereafter, the mixture was kneaded with a twin-screw extruder, and a film having a thickness of 200 μm was produced from the resultant by using a T-die. A JIS 4 dumbbell type specimen was punched out of such film, and its physical properties were measured. Table 2 shows the compounding parts by mass and the results of the measurement.

Example 9

50 parts by mass of poly(butyleneadipate-terephthalate) ["Ecoflex" manufactured by BASF Japan Ltd.] and 50 parts by mass of polylactic acid ["LACEA H-400" manufactured by Mitsui Chemicals, Inc.] used as biodegradable plastics were dry-blended with a carbodiimide compound, a UV absorbent, and an antioxidant at a compounding ratio shown in Table 2. Thereafter, the mixture was kneaded with a twin-screw extruder, and a film having a thickness of 200 μm was produced from the resultant by using a T-die. A JIS 4 dumbbell type specimen was punched out of such film, and its physical properties were measured. Table 2 shows the compounding parts by mass and the results of the measurement.

Comparative Example 9

A film and a specimen were produced through the same operation as that of Example 8 except that neither the UV absorbent nor the antioxidant was blended, and the physical properties of the specimen were measured. Table 2 shows the compounding parts by mass and the results of the measurement.

Comparative Example 10

A film and a specimen were produced through the same operation as that of Example 8 except that neither the UV absorbent nor the antioxidant was blended, and the physical properties of the specimen were measured. Table 2 shows the compounding parts by mass and the results of the measurement.

Comparative Example 11

A film and a specimen were produced through the same operation as that of Example 9 except that no UV absorbent was blended, and the physical properties of the specimen were measured. Table 2 shows the compounding parts by mass and the results of the measurement.

TABLE 1

|  | Example 1 | Example 2 | Example 3 | Example 4 | Example 5 | Example 6 | Example 7 | Comparative example 1 | Comparative example 2 |
|---|---|---|---|---|---|---|---|---|---|
| Biodegradable plastics (polylactic acid-"LACEA") | 100 | 100 | 100 | 100 | 100 | 100 | 100 | 100 | 100 |
| Carbodiimide compound in Synthesis Example 1 | 5 | — | — | — | — | — | — | 5 | 5 |

TABLE 1-continued

|  | | | | | | | | | |
|---|---|---|---|---|---|---|---|---|---|
| Carbodiimide compound in Synthesis Example 2 | — | 5 | 5 | — | — | — | — | — | — |
| Carbodiimide compound in Synthesis Example 3 | — | — | — | 5 | — | — | — | — | — |
| Carbodiimide compound in Synthesis Example 4 | — | — | — | — | 5 | — | — | — | — |
| Carbodiimide compound in Synthesis Example 5 | — | — | — | — | — | 5 | — | — | — |
| Aromatic carbodiimide ("Stabacsol P") | — | — | — | — | — | — | 5 | — | — |
| 2-[2'-hydroxy-3',5'-bis($\alpha,\alpha$-dimethyl-benzyl)phenyl]benzotriazole (UV absorbent-benzotriazole-based) | 0.5 | 0.5 | 0.5 | — | — | — | 0.5 | — | — |
| Bis(2,6-di-tert-butyl-4-methylphenyl) pentaerythritol-diphosphite (antioxidant-phosphorus-based) | 0.1 | — | 0.1 | — | — | — | 0.1 | — | 0.1 |
| Pentaerythritoltetrakis[3-(3,5-di-t-butyl-4-hydroxyphenyl)propionate] (antioxidant-hindered phenol-based) | — | 0.2 | 0.1 | — | — | — | 0.1 | — | — |
| Resistance to hydrolysis [ratio of strength (%)] | 93.4 | 90.7 | 91.7 | 94 | 91.5 | 90.9 | 85.2 | 56 | 71 |

|  | Comparative example 3 | Comparative example 4 | Comparative example 5 | Comparative example 6 | Comparative example 7 | Comparative example 8 |
|---|---|---|---|---|---|---|
| Biodegradable plastics (polylactic acid-"LACEA") | 100 | 100 | 100 | 100 | 100 | 100 |
| Carbodiimide compound in Synthesis Example 1 | 5 | 5 | 5 | 10 | 10 | 10 |
| Carbodiimide compound in Synthesis Example 2 | — | — | — | — | — | — |
| Carbodiimide compound in Synthesis Example 3 | — | — | — | — | — | — |
| Carbodiimide compound in Synthesis Example 4 | — | — | — | — | — | — |
| Carbodiimide compound in Synthesis Example 5 | — | — | — | — | — | — |
| Aromatic carbodiimide ("Stabacsol P") | — | — | — | — | — | — |
| 2-[2'-hydroxy-3',5'-bis($\alpha,\alpha$-dimethylbenzyl)phenyl]benzotriazole (UV absorbent-benzotriazole-based) | 0.3 | — | — | — | — | — |
| Bis(2,6-di-tert-butyl-4-methylphenyl) pentaerythritol-diphosphite (antioxidant-phosphorus-based) | — | — | 0.05 | — | — | 0.3 |
| Pentaerythritoltetrakis[3-(3,5-di-t-butyl-4-hydroxyphenyl)propionate] (antioxidant-hindered phenol-based) | — | 0.05 | 0.05 | — | 0.1 | — |
| Resistance to hydrolysis [ratio of strength (%)] | 73 | 72 | 71 | 59.7 | 74.2 | 75.2 |

TABLE 2

|  | Example 8 | Example 9 | Comparative example 9 | Comparative example 10 | Comparative example 11 |
|---|---|---|---|---|---|
| Biodegradable plastics ("Ecoflex") | 100 | 50 | 100 | 100 | 50 |
| Biodegradable plastics (polylactic acid-"LACEA") | — | 50 | — | — | 50 |
| Carbodiimide of Synthesis Example 1 | 3 | 3 | 3 | 3 | 3 |
| 2,2'-methylenebis[4-(1,1,3,3-tetramethylbutyl)-6-[(2H-benzotriazol-2-yl)phenol]] (UV absorbent-benzotriazole-based) | 0.3 | 0.3 | — | 0.3 | 0.3 |
| Tris-(2,4-di-t-butylphenyl)phosphite (antioxidant-phosphorus-based) | — | 0.1 | — | — | — |
| 3,9-bis[2-[3-(3-tert-butyl-4-hydroxy-5-methyl-phenyl)propionyloxy]-1,1-dimethylethyl]-2,4,8,10-tetraoxaspiro[5.5]undecane (antioxidant-hindered phenol-based) | 0.1 | — | — | — | — |
| Resistance to hydrolysis [ratio of tensile strength (%)] | 89.5 | 88.2 | 65 | 74.0 | 70.0 |

According to the present invention, there are provided a biodegradable plastics composition capable of retaining its functions for about ten years or longer, and a molded article molded out of the composition, and each of the composition and the molded article can be utilized in a consumer durable.

What is claimed is:

1. A biodegradable plastics composition comprising:
    100 parts by mass of a biodegradable plastics,
    0.01 to 10 parts by mass of a carbodiimide compound,
    0.01 to 5 parts by mass of an ultraviolet absorbent, and
    0.01 to 3 parts by mass of an antioxidant which is at least one of a hindered phenol-based antioxidant and a phosphite-based antioxidant,
    wherein the hindered phenol-based antioxidant is at least one selected from the group consisting of 4,4'-methylene-bis-(2,6-di-t-butylphenol), octadecyl-3-(3,5-di-t-butyl-4-hydroxyphenyl)propionate, pentaerythritoltetrakis[3-(3,5-di-t-butyl-4-hydroxyphenyl)propionate] and 3,9-bis[2-[3-(3-tert-butyl-4-hydroxy-5-methylphenyl)propionyloxy]-1,1-dimethylethyl]-2,4,8,10-tetraoxaspiro[5.5]undecane,
    and the phosphite-based antioxidant is at least one selected from the group consisting of tris-(2,4-di-t-butylphenyl) phosphite, bis-(2,4,di-t-butylphenyl)pentaerythritol-diphosphite, bis-(2,6-di-t-butyl-4-methylphenyl)pentaerythritol-diphosphite, [bis(2,4-di-t-butyl-5-methylphenoxy)phosphino]biphenyl and N,N-bis[2-[[2,4,8,10-tetrakis(1,1-dimethylethyl)dibenzo[d,f][1,3,2]dioxaphosphepin-6-yl]oxy]-ethyl]ethaneamine.

2. A biodegradable plastics composition according to claim 1, wherein the biodegradable plastics is one of plastics derived from natural products and plastics produced by microorganisms.

3. A biodegradable plastics composition according to claim 1, wherein the biodegradable plastics is an aliphatic polyester.

4. A biodegradable plastics composition according to claim 3, wherein the aliphatic polyester is an aliphatic hydroxycarboxylic polyester.

5. A biodegradable plastics composition according to claim 1, wherein the carbodiimide compound is an aliphatic polycarbodiimide compound.

6. A biodegradable plastics composition according to claim 1, wherein the carbodiimide compound is mainly composed of a component derived from at least one kind of organic diisocyanates selected from the group consisting of 4,4'-dicyclohexylmethane diisocyanate, isophorone diisocyanate, and tetramethylxylylene diisocyanate.

7. A biodegradable plastics composition according to claim 1, wherein the ultraviolet absorbent is at least one kind of an ultraviolet ray absorbent selected from the group consisting of a benzotriazole-based compound, a triazine-based compound, and a hydroxylamine-based compound.

8. A biodegradable plastics composition according to claim 1, wherein the ultraviolet absorbent has a molecular weight of 400 or more.

9. A biodegradable plastics composition according to claim 1, wherein the antioxidant has a molecular weight of 400 or more.

10. A biodegradable plastics composition according to claim 8, wherein the ultraviolet absorbent and/or the antioxidant are blended at the time of a synthesis of the carbodiimide compound to prepare a carbodiimide composition, followed by blending with a biodegradable plastics.

11. A molded article molded by the biodegradable plastics composition according to claim 1.

12. A biodegradable plastics composition according to claim 9, wherein the ultraviolet absorbent and/or the antioxidant are blended at the time of a synthesis of the carbodiimide compound to prepare a carbodiimide composition, followed by blending with a biodegradable plastics.

13. A biodegradable plastics composition according to claim 1, wherein the antioxidant is a mixture of the hindered phenol-based antioxidant and the phosphite-based antioxidant, and a mass ratio between the hindered phenol-based antioxidant and the phosphite-based antioxidant is in the range of 5:1 to 1:5.

14. A biodegradable plastics composition according to claim 1, wherein the carbodiimide compound is included in an amount of 0.1 to 7 parts by mass, the ultraviolet absorbent is included in an amount of 0.1 to 1 part by mass, and the antioxidant is included in an amount of 0.1 to 2 parts by mass, with respect to 100 parts by mass of the biodegradable plastics.

15. A method of controlling a biodegradation rate of a biodegradable plastics, comprising:
    blending (a) 100 parts by mass of the biodegradable plastics, (b) 0.01 to 10 parts by mass of a carbodiimide compound, (c) 0.01 to 5 parts by mass of an ultraviolet absorbent, and (d) 0.01 to 3 parts by mass of an antioxidant which is at least one of a hindered phenol-based antioxidant and a phosphite-based antioxidant,
    wherein the hindered phenol-based antioxidant is at least one selected from the group consisting of 4,4'-methylene-bis-(2,6-di-t-butylphenol), octadecyl-3-(3,5-di-t-butyl-4-hydroxylphenyl)propionate, pentaerythritoltetrakis [3-(3,5-di-t-butyl-4-hydroxyphenyl)propionate] and 3,9-bis[2-[3-(3-tert-butyl-4-hydroxy-5-methylphenyl)propionyloxy]-1,1-dimethylethyl]-2,4,8,10-tetraoxaspiro[5.5]undecane, and
    the phosphite-based antioxidant is at least one selected from the group consisting of tris-(2,4-di-t-butylphenyl) phosphite, bis-(2,4-di-t-butylphenyl)pentaerythritol-diphosphite, bis-(2,6-di-t-butyl-4-methylphenyl) pentaerythritol- diphosphite, [bis(2,4-di-t-butyl-5-methylphenoxy)phosphino]biphenyl and N,N-bis[2-[[2,4,8,10-tetrakis (1,1-dimethylethyl) dibenzo [d,f][1,3,2] dioxaphosphepin-6-yl]oxy]-ethyl]ethaneamine.

* * * * *